US010204048B2

(12) United States Patent
Teletia et al.

(10) Patent No.: US 10,204,048 B2
(45) Date of Patent: Feb. 12, 2019

(54) REPLICATING A PRIMARY APPLICATION CACHE WITHIN A SECONDARY APPLICATION CACHE

(71) Applicant: Microsoft Technology Licensing, LLC, Redmond, WA (US)

(72) Inventors: Nikhil Teletia, Madison, WI (US); Jae Young Do, Madison, WI (US); Kwanghyun Park, Madison, WI (US); Jignesh M. Patel, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/604,338

(22) Filed: May 24, 2017

(65) Prior Publication Data

US 2017/0255555 A1    Sep. 7, 2017

Related U.S. Application Data

(63) Continuation of application No. 14/631,698, filed on Feb. 25, 2015, now Pat. No. 9,684,596.

(51) Int. Cl.
*G06F 12/00* (2006.01)
*G06F 12/0813* (2016.01)
(Continued)

(52) U.S. Cl.
CPC .......... *G06F 12/0813* (2013.01); *G06F 11/00* (2013.01); *G06F 11/1484* (2013.01);
(Continued)

(58) Field of Classification Search
CPC ............. G06F 12/0815; G06F 12/0875; G06F 2212/283; G06F 2212/284; G06F 2212/452; G06F 2212/6042
(Continued)

(56) References Cited

U.S. PATENT DOCUMENTS 6,021,480 A   2/2000  Pettey
6,549,210 B1  4/2003  Van Hook et al.
(Continued)

FOREIGN PATENT DOCUMENTS

CN   101470645   7/2009
CN   102012849   4/2011
(Continued)

OTHER PUBLICATIONS

"Cache Warming", Retrieved From <<http://infocenter.sybase.com/help/index.jsp?topic=/com.sybase.help.sqlanywhere.12.0.1/dbusage/perform-s-4988196.html>>, Dec. 17, 2014, 2 Pages.
(Continued)

*Primary Examiner* — Mardochee Chery
(74) *Attorney, Agent, or Firm* — Workman Nydegger

(57) ABSTRACT

Replicating a primary application cache that serves a primary application on one network node into a secondary application cache that serves a secondary application on a second network node. Cache portions that are within the primary application cache are identified, and then identifiers (but not the cache portions) are transferred to the second network node. Once these identifiers are received, the cache portions that they identify may then be retrieved into the secondary application caches. This process may be repeatedly performed such that the secondary application cache moves towards the same state as the primary application cache though the state of the primary application cache also changes as the primary application operates by receiving read and write requests.

20 Claims, 7 Drawing Sheets

Computing System
100

(51) Int. Cl.
| | |
|---|---|
| *G06F 12/02* | (2006.01) |
| *G06F 12/0875* | (2016.01) |
| *H04L 29/08* | (2006.01) |
| *G06F 12/0815* | (2016.01) |
| *G06F 12/0842* | (2016.01) |
| *G06F 11/00* | (2006.01) |
| *G06F 11/14* | (2006.01) |
| *G06F 11/20* | (2006.01) |

(52) U.S. Cl.
CPC ...... *G06F 12/0246* (2013.01); *G06F 12/0815* (2013.01); *G06F 12/0842* (2013.01); *G06F 12/0875* (2013.01); *H04L 67/1095* (2013.01); *H04L 67/2842* (2013.01); *G06F 11/202* (2013.01); *G06F 2212/264* (2013.01); *G06F 2212/283* (2013.01); *G06F 2212/284* (2013.01); *G06F 2212/452* (2013.01); *G06F 2212/6042* (2013.01)

(58) Field of Classification Search
USPC .......................................... 711/103; 707/610
See application file for complete search history.

(56) References Cited

U.S. PATENT DOCUMENTS

| | | | |
|---|---|---|---|
| 7,475,190 B2 * | 1/2009 | Hoover | G06F 12/084 709/213 |
| 7,533,215 B2 | 5/2009 | Faber | |
| 8,489,815 B2 | 7/2013 | Iyigun et al. | |
| 8,521,959 B2 | 8/2013 | Zhang et al. | |
| 8,612,383 B2 * | 12/2013 | Sandhu | H04L 29/08729 707/610 |
| 8,738,579 B2 | 5/2014 | Huras et al. | |
| 9,114,758 B1 | 8/2015 | Poudrier | |
| 9,684,607 B2 | 6/2017 | Teletia et al. | |
| 2003/0056143 A1 | 3/2003 | Prabhu | |
| 2004/0024969 A1 | 2/2004 | Chauvel et al. | |
| 2005/0144398 A1 | 6/2005 | Hammarlund et al. | |
| 2007/0005883 A1 | 1/2007 | Trika | |
| 2008/0256298 A1 | 10/2008 | Lu et al. | |
| 2010/0114919 A1 | 5/2010 | Sandhu | |
| 2010/0169497 A1 * | 7/2010 | Klimentiev | G06F 9/546 709/228 |
| 2010/0318584 A1 | 12/2010 | Krishnaprasad et al. | |
| 2011/0148895 A1 | 6/2011 | Burckart et al. | |
| 2011/0197046 A1 | 8/2011 | Chiu et al. | |
| 2012/0173819 A1 | 7/2012 | Solihin | |
| 2014/0229676 A1 | 8/2014 | Biswas et al. | |
| 2014/0372703 A1 | 12/2014 | Ricketts et al. | |
| 2015/0039717 A1 | 2/2015 | Chiu et al. | |
| 2016/0011938 A1 * | 1/2016 | Koseki | G06F 12/04 714/766 |
| 2016/0055095 A1 * | 2/2016 | Faraboschi | G06F 12/0804 711/118 |
| 2016/0232077 A1 | 8/2016 | Hu et al. | |
| 2016/0246719 A1 | 8/2016 | Teletia et al. | |
| 2016/0246735 A1 | 8/2016 | Teletia et al. | |

FOREIGN PATENT DOCUMENTS

| | | |
|---|---|---|
| CN | 102043727 | 5/2011 |
| JP | H11110301 | 4/1999 |
| WO | 2014100253 | 6/2014 |

OTHER PUBLICATIONS

"Non Final Rejection Issued in U.S. Appl. No. 14/631,695", dated Nov. 30, 2016, 13 Pages. (MS# 356449-US-NP).
"Notice of Allowance Issued in U.S. Appl. No. 14/631,695", dated Mar. 10, 2017, 6 Pages. (MS# 356449-US-NP).
"Non Final Office Action Issued in U.S. Appl. No. 14/631,698", dated Nov. 4, 2016, 12 Pages. (MS# 356655-US-NP).
"Notice of Allowance Issued in U.S. Appl. No. 14/631,698", dated Feb. 27, 2017, 5 Pages. (MS# 356655-US-NP).
Barr, Jeff, "MySQL Cache Warming for Amazon RDS", Retrieved From >>https://aws.amazon.com/blogs/aws/rds-mysql-cache-warming/>>, Sep. 3, 2014, 3 Pages.
Das, et al., "Albatross: Lightweight Elasticity in Shared Storage Databases for the Cloud using Live Data Migration", In Proceedings of Very Large Database Endowment, vol. 4, Issue 8, May, 2011, pp. 494-505.
Ng, et al., "Integrating Reliable Memory in Databases", In International Journal on Very Large Data Bases, vol. 7, Issue 3, Aug. 1998, pp. 194-204.
"International Preliminary Report on Patentability Issued in PCT Application No. PCT/US2016/018999", dated Dec. 1, 2016, 7 Pages. (MS# 356449-WO-PCT).
"International Search Report and Written Opinion Issued in PCT Application No. PCT/US2016/018999", dated May 6, 2016, 12 Pages. (MS# 356449-WO-PCT).
"Second Written Opinion Issued in PCT Application No. PCT/US2016/018999", dated Aug. 2, 2016, 6 Pages. (MS# 356449-WO-PCT).
"Second Written Opinion Issued in PCT Application No. PCT/US2016/019000", dated Jul. 28, 2016, 6 Pages. (MS# 356655-WO-PCT).
"International Search Report and Written Opinion Issued in PCT Application No. PCT/US2016/019000", dated May 2, 2016, 11 Pages. (MS# 356655-WO-PCT).
"International Preliminary Report on Patentability Issued in Patent Application No. PCT/US2016/019000", dated Nov. 30, 2016, 7 Pages. (MS# 356655-WO-PCT).
Office Action dated Feb. 28, 2018 issued in U.S. Appl. No. 15/616,099.
"Non Final Office Action Issued in U.S. Appl. No. 15/616,099", dated Sep. 21, 2017, 12 pages.

* cited by examiner

200
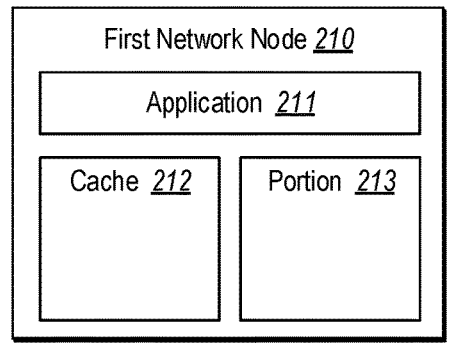
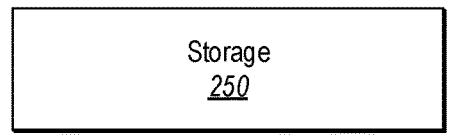
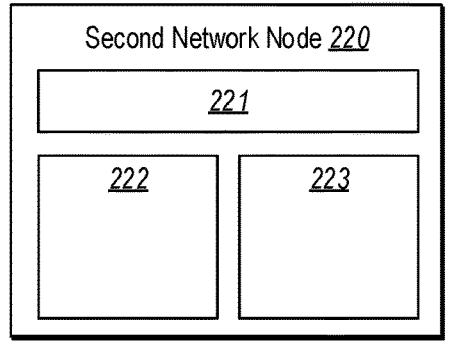 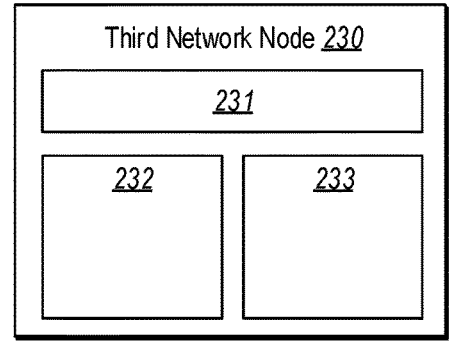
⋮~ 240
*Figure 2*

400A
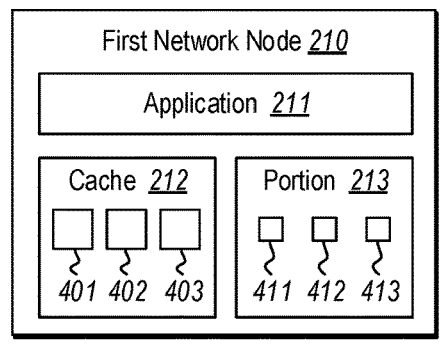
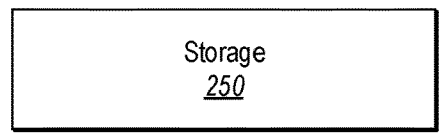
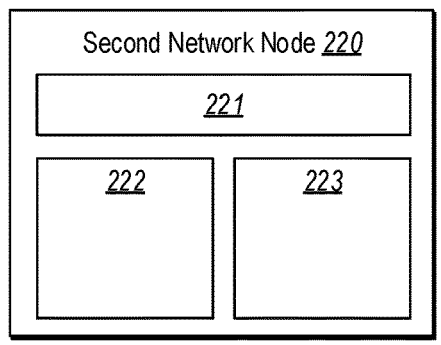 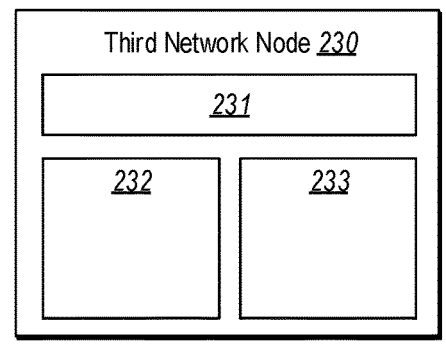
⋮ ～ 240
*Figure 4A*

REPLICATING A PRIMARY APPLICATION CACHE WITHIN A SECONDARY APPLICATION CACHE

CROSS REFERENCE TO RELATED APPLICATION

This application is a continuation of, and claims the benefit of, U.S. Ser. No. 14/631,698, filed Feb. 25, 2015, and entitled "APPLICATION CACHE REPLICATION to SECONDARY APPLICATION(S)," the entire contents of which are incorporated by reference herein in their entirety.

BACKGROUND

The amount of information available to users over the Internet or via corporate networks is practically limitless, which is why today's era is often termed the "information age". While computing hardware provides the hardware support for computers, it is the applications that direct the operation of the hardware to perform myriad functions. In order to support the information age, such applications require access to information, often referred to as data.

For best performance, data is often present in a hierarchy, with more often and/or recently used data being cached more locally with higher access speeds and with lesser used data being made available outside of the cache with slower access speeds. The recency and/or frequency of data access is often predictive of future accesses of the data, and is often referred to with analogous references to temperature (such as "warmth", "hotness", "coolness", "temperature"). For instance, the hotter a gas molecule is, the more frequently and aggressively it interacts with surrounding molecules. Accordingly, the temperature metaphor has been widely adopted for use with data accesses.

As an application interacts with underlying data store hierarchies, the application builds up a cache, allowing the application to approach peak performance as warm data is loaded into the more efficiently accessed cache. For purposes of availability, especially in a cloud computing environment, and application will often have one or two secondary replica applications running on different compute nodes. Writes that are made to the primary application are also made at the secondary application. If the primary application on one compute node were to fail, the cloud computing infrastructure switches to one of the secondary applications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein operate in environments in which a primary application has one or more secondary applications, such as replica applications, operating on other network nodes. As an example, such redundant applications may be operated for purposes of availability of the application. In accordance with the principles described herein, the primary application cache of the primary application is evaluated purposes of moving the secondary application cache of the secondary application towards the same state. That way, if the primary application does fail, the secondary application may continue operating with a similar, if not identical, content of the application cache as the secondary application takes on the primary role.

Write requests made to the primary application are also performed at the secondary application(s). However, any given secondary application cache might still be in a different state than the primary application cache because the primary application is exposed to different read requests than the secondary application. For instance, the primary application may be the exclusive performer of read requests. Furthermore, there may be times in which although a write is performed at the primary application, one or more of the secondary applications do not perform the write operation (e.g., due to communication difficulty). Accordingly, a state of any given secondary application cache may, at any given time, be different than the state of the primary application cache.

In accordance with the principles described herein, there is a method for at least partially replicating the primary application cache in the secondary application cache. The method includes identifying at least some cache portion identifiers that are within the primary application cache, and causing the identified cache portion identifiers be transferred to the second network node. For instance, this might be accomplished by a portion of a distributed replication module that is located on the same machine as the primary application cache. Once these identifiers are received, at least one of the cache portions identified in the transferred cache portion identifiers is then retrieved into the secondary application caches. For instance, this retrieval might be accomplished by a portion of the distributed replication module that is located on the same machine as the secondary application cache. This process may be repeatedly performed such that the secondary application cache moves towards the same state as the primary application cache though the state of the primary application cache also changes as the primary application operates by receiving read and write requests. Furthermore, this process may be performed for multiple secondary replica applications so that their respective application caches tend to be closer to the state of the primary application cache.

The cache portion identifiers may be quite small as compared to the cache portion itself. Accordingly, in one embodiment, the second network node running the secondary application may be frequently updated with the identifiers of the cache portions that are in the primary application cache. However, because the cache portions themselves are much larger, the frequency by which the identified cache portions are retrieved and placed into the secondary application cache may be much less frequent. Such lower frequency retrieval may take advantage of efficiencies in that in cases in which cache portions pop into and then back out of the primary application cache, the loading of that cache portion into the secondary application cache might be avoided. Furthermore, if warmth information is also associated with each identifier, the retrieval of the cache portions may prioritize by warmth of the cache portion.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 2 illustrates a network system that includes multiple network nodes, each operating thereon at least a portion of an application replica, an associated cache, and a portion of a distributed cache replica module;

FIG. 4A illustrates a state the network system of FIG. 2, but in which there are illustrated three cache portions within the primary application cache due to the operation of the primary application;

DETAILED DESCRIPTION

Figure 1:
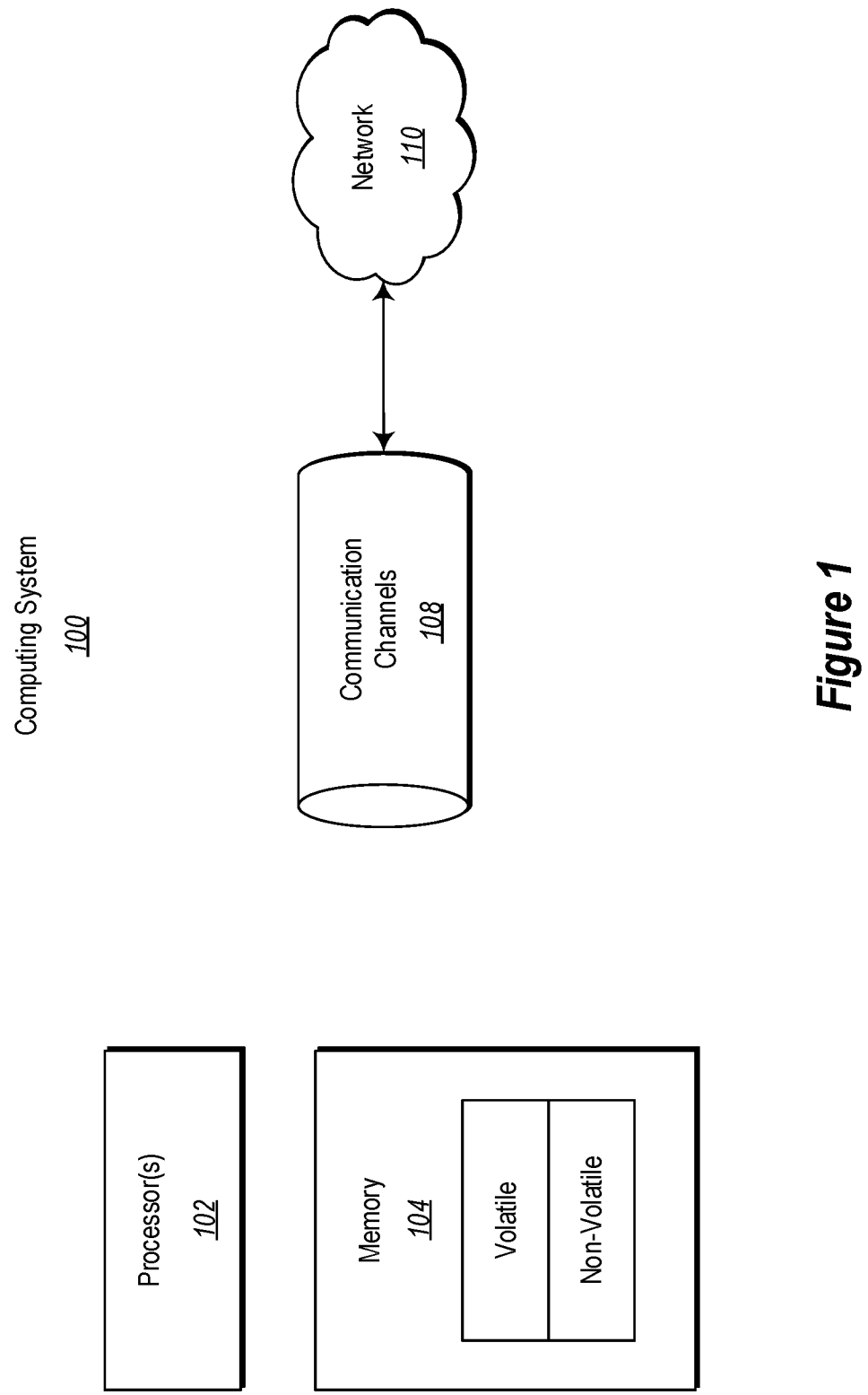
FIG. 1 abstractly illustrates a computing system in which some embodiments described herein may be employed.

At least some embodiments described herein operate in environments in which a primary application has one or more secondary applications, such as replica applications, operating on other network nodes. As an example, such redundant applications may be operated for purposes of availability of the application. In accordance with the principles described herein, the primary application cache of the primary application is evaluated for purposes of moving the secondary application cache of the secondary application towards the same state. That way, if the primary application does fail, the secondary application may continue operating with a similar, if not identical, content of the application cache as the secondary application takes on the primary role.

Write requests made to the primary application are also performed at the secondary application(s). However, any given secondary application cache might still be in a different state than the primary application cache because the primary application is exposed to different read requests than the secondary application. For instance, the primary application may be the exclusive performer of read requests. Furthermore, there may be times in which although a write is performed at the primary application, one or more of the secondary applications do not perform the write operation (e.g., due to communication difficulty). Accordingly, a state of any given secondary application cache may, at any given time, be different than the state of the primary application cache.

In accordance with the principles described herein, there is a method for at least partially replicating the primary application cache in the secondary application cache. The method includes identifying at least some cache portion identifiers that are within the primary application cache, and causing the identified cache portion identifiers be transferred to the second network node. For instance, this might be accomplished by a portion of a distributed replication module that is located on the same machine as the primary application cache. Once these identifiers are received, at least one of the cache portions identified in the transferred cache portion identifiers is then retrieved into the secondary application caches. For instance, this retrieval might be accomplished by a portion of the distributed replication module that is located on the same machine as the secondary application cache. This process may be repeatedly performed such that the secondary application cache moves towards the same state as the primary application cache though the state of the primary application cache also changes as the primary application operates by receiving read and write requests. Furthermore, this process may be performed for multiple secondary replica applications so that their respective application caches tend to be closer to the state of the primary application cache.

The cache portion identifiers may be quite small as compared to the cache portion itself. Accordingly, in one embodiment, the second network node running the secondary application may be frequently updated with the identifiers of the cache portions that are in the primary application cache. However, because the cache portions themselves are much larger, the frequency by which the identified cache portions are retrieved and placed into the secondary application cache may be much less frequent. Such lower frequency retrieval may take advantage of efficiencies in that in cases in which cache portions pop into and then back out of the primary application cache, the loading of that cache portion into the secondary application cache might be avoided. Furthermore, if warmth information is also associated with each identifier, the retrieval of the cache portions into the secondary application cache may prioritize by warmth of the cache portion.

Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 2 illustrates a network system 200 that includes multiple network nodes. For instance, the network system 200 includes a first network node 210, a second network node 220, and potentially also a third network node 230. However, the ellipses 240 represent that the principles described herein may operation in any network environment that includes two or more network nodes. In one embodiment, the network system 200 is a cloud computing environment, and the network nodes 210, 220, 230 and 240 may be compute nodes within that cloud computing environment.

The network 200 also includes storage 250 that the network nodes 210, 220, 230 and 240 may potentially read from or write to. The storage 250 may be located on a single network node, or may be distributed across multiple network nodes. As an example, if the network system 200 were in a cloud computing environment, the storage 250 may be a storage node.

The first network node 210 has operating thereon at least part of an application 211. The second network node 220 has operating thereon at least a part of a secondary application 221 for the primary application 211. The third network node 230 has operation thereon at least part of a secondary application 231 for the primary application 211.

In order to provide high availability of the application, secondary versions (e.g., replicas) 221, 231 of the application 211 are operating within the network system 200, and are associated with the primary application 211. Accordingly, the application 211 running on the first network node 210 may be consider the "primary" application 211. In other words, if the primary application 211 ceases proper operation for any reason (such as failure of the software of the primary application 211, or failure of the first network node 210 itself), one or the secondary applications 221 and 231 is ready to continue at least approximately where the primary application 211 left off and take over the role as primary application. Should the secondary application (e.g., secondary application 221) that became primary also fail, then the other secondary application 231 may take over approximately where the other secondary application 221 left off. In the context in which there is to be two layers of redundancy guaranteed, if the primary application 211 did fail, and the secondary application 221 became primary, an additional application (not shown) might be associated with the now primary application 221, so as to maintain the two levels of redundancy.

The application 211 might be any application for which high availability may be advantageous. As an example, the application 211 might be a database application, in which case the secondary applications 221 and 231 might be like (e.g., replica) database applications. The application 211 might also be a virtual machine, in which case, the secondary applications 221 and 231 might be like (e.g., replica) virtual machines. The application 211 might also be an operating system, in which case, the secondary applications 221 and 231 might be like (e.g., replica) operating systems.

Each network node also includes a cache for that network node. For instance, the network nodes 210, 220 and 230 have corresponding caches 212, 222 and 232 that may serve as application caches for respective local applications 211, 221 and 231. For instance, data that the primary application 211 reads from or writes to the storage 250 may be cached within the primary application cache 212. In the embodiments described herein, writes to the storage 250 that result directly from application logic and thus result in data being stored in an application cache are performed by the primary application 211, rather than the secondary applications 221 and 231. The application caches 212, 222 and 232 may be volatile, non-volatile, or a combination thereof. Furthermore, the application caches 212, 222 and 232 may be more than one level of cache and thus represent multiple potential levels of caching.

In one embodiment referred to herein as the "primary central" embodiment, all read operations are directed to the primary application 211, and thus only the primary application 211 responds to read requests by reading from the storage 250 and caching the read content in the primary application cache 212. The secondary applications 221 and 231 perform read operations only responsive to changes in the primary application cache 212 in order to that the application caches 222 and 232 become more current with the primary application cache 212.

Another embodiment will be referred to herein as the "distributed read" embodiment. In the distributed read embodiment, any of the application replicas 211, 221 and 231 may respond to a read request by reading data from the storage 250 and caching the read data within the respective application caches 212, 222 and 232. Having called out these two specific embodiments, however, the general principles described herein are by no means limited to these specific embodiments.

In either embodiment, write requests made to the primary application 211 are also attempted, and preferably completed, at the secondary applications 221 and 231. Accordingly, differences in cache state may result from exposure to different sets of read requests (e.g., in the primary central embodiment, the secondary applications 221 and 231 do not receive read requests at all). However, some differences in cache state might be the result of a failed write request at one or more of the secondary applications. However, in the case of a failed write request, there may be consistency issues that also are to be addressed. In embodiments, in which writes to the primary application cache and writes to secondary application cache are made atomically within a single transaction, then all differences would be due to differences in read requests.

Each network node has operating thereon a portion of a distributed cache replication module. For instance, the network nodes 210, 220 and 230 have respective portions 213, 223 and 233 of the distributed cache replication module stored thereon. The portions 213, 223 and 233 communicate with the goal that the application caches 222 and 232 at least over time tend to move towards the same state as the primary application cache. That way, should the primary application 211 fail, one of the secondary applications 221 or 231 may proceed with an application cache state that is at least closer to the state of the primary application cache 212 than without the operation of the distributed cache replication module.

Figure 3:
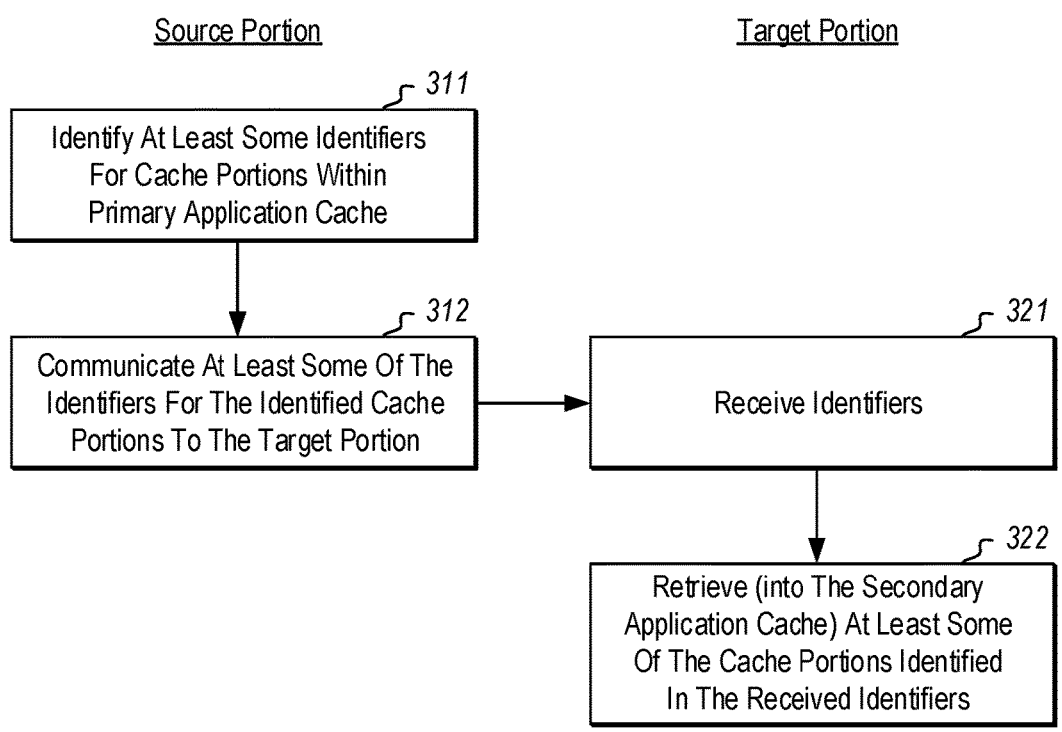
FIG. 3 illustrates a flowchart of a method for at least partially replicating a primary application cache in a secondary application cache.
Figure 4B:
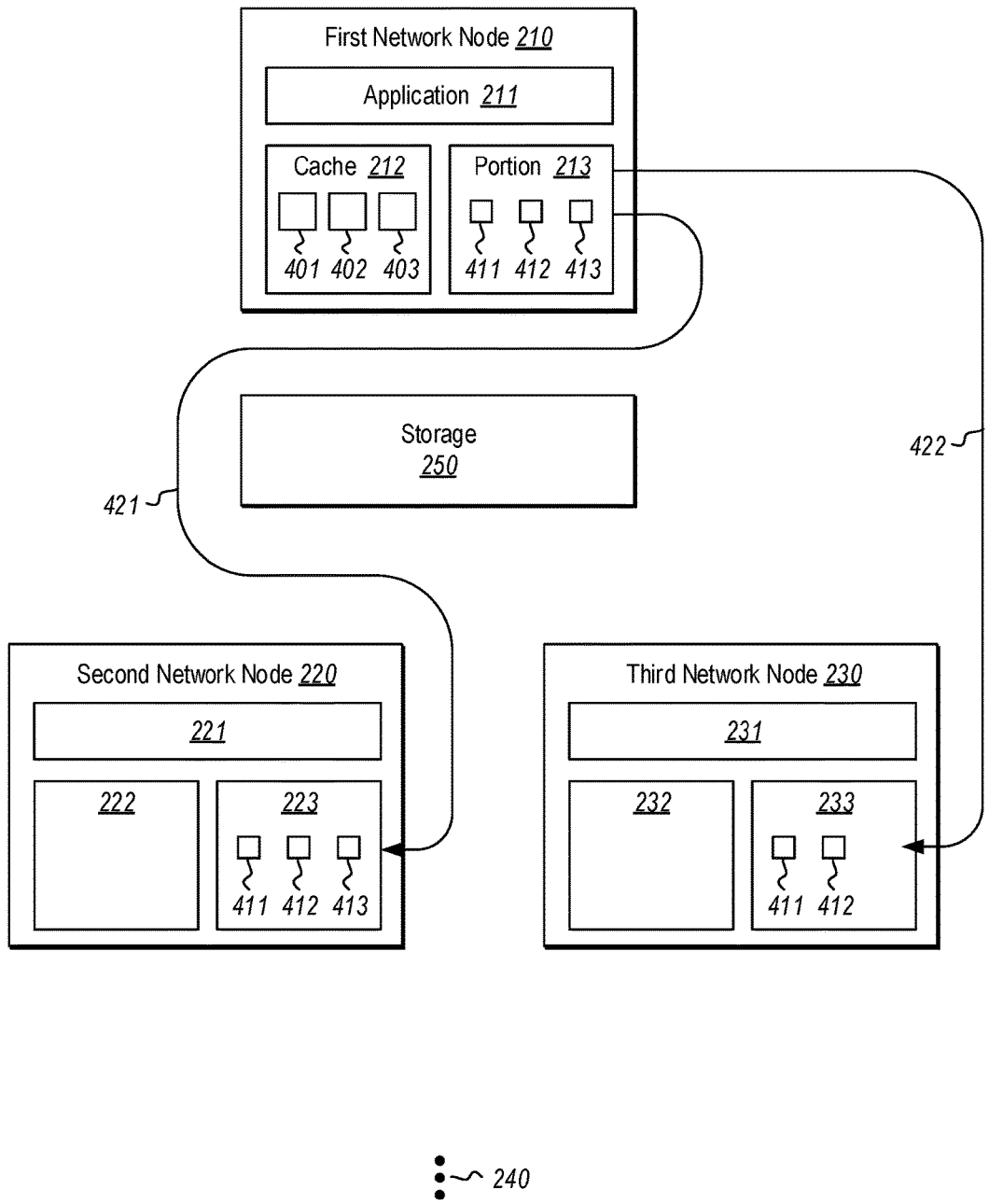
FIG. 4B illustrates a subsequent state the network system of FIG. 2, but in which the source portion has notified the target portions of at least some of the identifiers within the primary application cache.
Figure 4C:
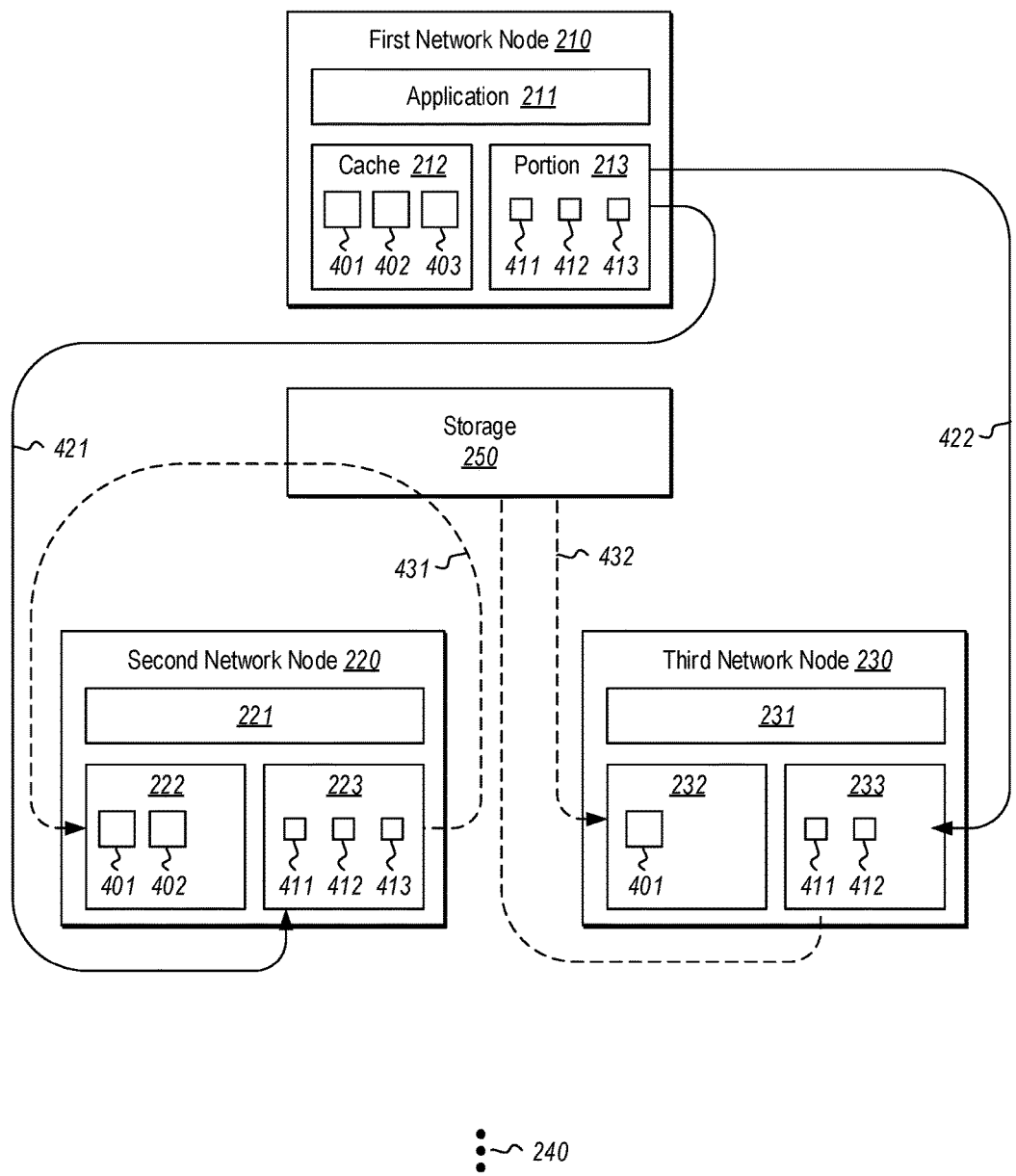
FIG. 4C illustrates a subsequent state the network system of FIG. 2, but in which the target portion has retrieved into the associated secondary application cache at least some of those cache portions that are identified by at least some of the received identifiers.

FIG. 3 illustrates a flowchart of a method 300 for at least partially replicating a primary application cache in a secondary application cache. For instance, the method 300 may be performed in the network system 200 of FIG. 2, in the context of the primary application cache being the primary application cache 212, and the secondary application cache being the secondary application cache 222 and/or the secondary application cache 232. Accordingly, the method 300 of FIG. 3 will be described with frequent reference to the network system 200 of FIG. 2. Furthermore, FIGS. 4A through 4C illustrates various states 400A through 400C, respectively, of the environment 200. Accordingly, the method 300 of FIG. 3 will also be described with frequent reference to the states 400A through 400C of FIGS. 4A through 4C respectively. Initially, the primary central embodiment will be described with respect to FIGS. 4A through 4C. Thereafter, the principles will be extended to apply to the distributed read embodiment.

Some parts of the method 300 may be performed by the portion (called hereinafter the "source portion") of the distributed cache replication module that resides on the same network node as the primary application cache. The acts performed by the source portion are illustrated in the left column of FIG. 3 under the heading "Source Portion". Other parts of the method 300 may be performed by the portion (called hereinafter the "target portion") of the distributed cache replication module that resides on the same network node as the secondary application cache. The acts performed by the target portion are illustrated in the right column of FIG. 3 under the heading "Target Portion". For instance, in the case of the secondary application caches 222 and 232 being replicated towards the primary application cache 212, the portion 213 of the distributed cache replication module on the first network node 210 would be the source portion, and the respectively portions 223 and 233 of the distributed cache replication module on the second and third network nodes 220 and 230, respectively, would each be instances of the target portion. The portion 223 would serve as the target portion for replication of the secondary application cache 222 towards the primary application cache 212. The portion 233 would serve as the target portion for replication of the secondary application cache 232 towards the primary application cache 212.

In accordance with the method 300, the source portion identifies at least some cache portions identifiers for the cache portions that are within the primary application cache (act 311). For instance, FIG. 4A illustrates a state 400A of the network system 200 of FIG. 2. The network system in FIG. 4A is similar to that of FIG. 2, except that there are illustrated three cache portions 401, 402 and 403 within the primary application cache 212 due to the operation of the primary application. The source portion 213 identifies that those cache portions 401, 402 and 403 are within the primary application cache 212. The corresponding identifiers 411, 412 and 413 are thus within the source portion 213. The identifiers 411, 412 and 413 for the cache portions 401, 402 and 403 are much smaller than the cache portions 401, 402 and 403 themselves.

After the source portion identifies at least some cache portions identifiers of the cache portions that are within the primary application cache, the source portion communicates identifiers for at least some of the identified cache portions to a corresponding secondary application operating on another network node (act 312). This communication is performed (act 312) for potentially multiple secondary applications. For instance, FIG. 4B illustrates a subsequent state 400B of network system 200. In particular, the source portion 213 communicates at least some of the identifier 411, 412, 413 to the target portion 223 as represented by arrow 421. Accordingly, the arrow 421 represents one instance of the source portion 213 performing the act 312. Alternatively or in addition the source portion 213 communicates at least some of the identifiers 411, 412, 413 to the target portion 233 as represented by arrow 422. Accordingly, the arrow 422 represents another potential instance of the source portion 213 performing the act 312.

In some embodiments, the communicated identifiers will depend on the role of the application. For instance, in FIG. 4B, perhaps the secondary application 221 is to be the immediate successor to the primary application 211 in case of failure of the primary application 211. Furthermore, suppose that the secondary application 231 is just the successor to the successor. In that case, the identification may be more complete to the target portion 223 that operates for the secondary application 221, than to the target portion 233 that operates for the tertiary application 231. For instance, in FIG. 4B, the target portion 223 is shown as being notified of all of the identifiers 411, 412 and 413, whereas the target portion 232 is shown as being notified of only some 411 and 412 of those identifiers.

As another example, the identifiers may be limited to those cache portions that were placed into the primary application cache due to a read operation. Thus, cache portions that are within the primary application cache due to write operations that are known to have been successfully completed also at the secondary application cache might be excluded from the communication.

Upon receiving the identifiers (act 321), the target portion retrieves into the secondary application cache at least one of the cache portions identified in the transferred cache portion identifiers (act 322). For instance, FIG. 4C illustrates a subsequent state 400C of the network system 200. In particular, the target portion 223 receives the identifiers (as represented by the arrow 421), and the target portion 233 also receives the identifiers (as represented by arrow 422). The target portion 223 responds to receiving the identifiers (as represented arrow 421), by retrieving at least one of the identified cache portions into the secondary application cache 222 (as represented by dashed lined arrow 431). The target portion 233 responds to receiving the identifiers (as represented arrow 422), by retrieving at least one of the identified cache portions into the secondary application cache 232 (as represented by dashed-lined arrow 432).

In one embodiment, the target portion retrieves into the corresponding secondary application cache all of the cache portions of which it is notified right away. Doing so would result in the secondary application caches being high fidelity replications of the primary application cache in real time. In other embodiments, the target source does not immediately retrieve one or more or potentially all of the cache portions right away. In some embodiments, one or more of the identified cache portions might not be retrieved at all.

As an example, the source portion may perform the act of identifying (act 311) and the act of communicating (312) multiple times for different identified cache portion identifiers as the primary application operates, and the identity of the cache portions within the primary application cache changes. Furthermore, the target portion may perform the act of retrieving the identified cache portions (act 322) multiple times. Accordingly, as time moves forward, the secondary application cache tends to move towards a moving target of the same state as the primary application cache. Thus, if the secondary application has to take over due to a failure of the primary application, the secondary application cache will be much warmer and ready to go than would be without such replication attempts.

For instance, the cache portion identifiers may be quite small as compared to the cache portion itself. Accordingly, the target portion might be frequently updated with identifiers that are within the primary application cache. However, because the cache portions themselves are much larger, the average frequency by which the identified cache portions are retrieved and placed into the secondary application cache may be much less frequent (e.g., by at least twice, by an order of magnitude, by several orders of magnitude or even more) than the average frequency by with the cache portions are identified. Such lower frequency retrieval may take advantage of efficiencies in that in cases in which cache portions pop into and then back out of the primary application cache, the loading of that cache portion into the secondary application cache might be avoided. Furthermore, if warmth information is also associated with each identifier, the retrieval of the cache portions into the secondary application cache may prioritize by warmth of the cache portion.

In the illustrated case of FIG. 4C, for one reason or another, the target portion 223 exercised its logic to determine that, as for the time being, only the cache portions 401 and 402 identified by identifiers 411 and 412 are to be retrieved into the secondary application cache 222 (see arrow 431). Accordingly, the cache portion 413 might be later retrieved. Furthermore, for one reason or another, the target portion 233 exercised its logic to determine that, as for the time being, only the cache portion 401 identified by identifier 411 is to be retrieved into the secondary application cache 222 (see arrow 432). Accordingly, the cache portion 412 might be later retrieved.

There are some network and computing resources associated with loading data (such as pages) into a local application cache. Accordingly, depending on a variety of parameters, the source portion may limit what identifiers the target portion is notified of, and the target portion may limit what data is actually retrieved into the application cache. For instance, the aggressiveness by which the target portion is notified (act 312), and by which the target portion retrieves (act 322) might depend on one or a combination of a variety of factors such as whether or not the target portion has already been notified that the identifier identifies a cache portion within the primary application cache, and/or whether the identified cache portion is already present within the secondary cache. Alternatively or in addition, the frequency might also depend on a role of the associated secondary application, a likelihood estimation that the secondary application will become primary (perhaps ever or within a certain time range), a hotness metric of the associated cache portion, and so forth.

Figure 5:
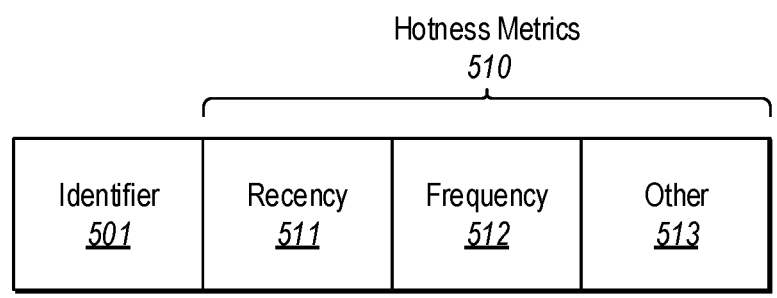
FIG. 5 illustrates a captured cache portion state that includes a cache portion identifier for the associated cache portion, as well as hotness metrics for the associated cache portion.

With respect to the hotness metric, in one embodiment, the source portion not only communicates the identifier itself, but also communicates associated hotness metrics that are relevant to how frequently and/or recently the primary application 211 has accessed the cache portion. FIG. 5 illustrates a captured cache portion state 500 that may be communicated in act 312. The cache portion state 500 includes a cache portion 501 identifier for the associated cache portion. In addition the cache portion state 500 may optionally include one or more hotness metrics 510 for the associated cache portion. The "hotness" metrics refers to metrics that correlate to a likelihood that the cache portion may be accessed by the primary application 211 in the near future. As temperature references a frequency and likelihood of interaction of one gaseous molecule with another, temperature has also been adopted in the field of data access to represent likelihood that data will be accessed by an application. Of course, the determination of the warmth, hotness, or temperature of a portion of data is an approximate estimation, and not necessarily deterministic, and is not a function of the data itself, but a function of how an application has historically interacted with data. Data that is hot with respect to one application may be cool with respect to another application.

Note that in addition as part of retrieving the cache portion into the application cache (act 322), the target portion may also release cache portions from the application cache. For instance, if through the communication of act 312, the target portion is able to determine that a cache portion is no longer within the primary application cache, the target portion may release the cache portion from the secondary application cache if present therein. Of course, the same factors that are considered when retrieving a cache portion into the application cache, may also be considered when determining to release a cache portion from the application cache. This might preserve computing resources should the cache portion just released from the primary application cache later return to the primary application cache. By introducing some delay, the secondary network node can forgo releasing, and re-retrieving the application cache.

Up until now, the primary central embodiment has been described in which changes due to application state changes are made first to the primary application cache 212. Any changes to the secondary application caches 222 and 232 are responsive thereto. However, in the distributed read embodiment, any of the application caches 212, 222 and 232 may first change in response to a read request directed at the corresponding application replica 211, 221 or 231. In that case, for any changes made first to the secondary application cache 222, the portion 223 acts as a source portion of the distributed cache replication module, and the portions 213 and 233 act as the target portion of the distributed cache replication module. In addition, for any changes made first to the secondary application cache 232, the portion 233 acts as a source portion of the distributed cache replication module, and the portions 213 and 223 act as the target portion of the distributed cache replication module.

Accordingly, what has been described is an efficient mechanism for replicating application caches in an environment in which there are distributed application replicas operating. The replication may be immediate, or less aggressive depending on the computing system, the roles of the replicas, warmth of the data, and a variety of other factors. Accordingly, the principles described herein allow balance to be introduced into such distributed replication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a first computer system that includes one or more processors, for replicating, at an application cache of the first computer system, at least a portion of an application cache of a second computer system, the method comprising:
   receiving a plurality of cache portion identifiers from the second computer system, the plurality of cache portion identifiers each being associated with one of a plurality of cache portions that have been added to the application cache of the second computer system, each given cache portion identifier of the plurality of cache portion identifiers comprising less than an entirety of a cache portion to which the given cache portion identifier corresponds;
   in response to receiving the plurality of cache portion identifiers, retrieving one or more cache portions that each correspond to one of the plurality of received cache portion identifiers from a storage node that is separate from the first computer system and the second computer system; and
   caching at least one cache portion of the one or more retrieved cache portions in the application cache of the first computer system.

2. The method of claim 1, wherein the storage node is a network-based storage node shared by the first and second computer systems.

3. The method of claim 1, wherein the application cache at the second computer system comprises a primary application cache, and the application cache at the first computer system comprises a secondary application cache.

4. The method of claim 1, wherein retrieving the one or more cache portions comprises retrieving all cache portions associated with the plurality of received identifiers.

5. The method of claim 1, wherein retrieving cache portions occurs multiple times as an application operates at the second computer system.

6. The method of claim 1, wherein the first and second computer systems are compute nodes within a cloud computer system.

7. The method of claim 1, wherein one or more of the application cache at the second computer system or the application cache at the first computer system is stored on volatile memory.

8. The method of claim 1, wherein one or more of the application cache at the second computer system or the application cache at the first computer system is stored on non-volatile memory.

9. The method of claim 1, wherein the application cache is a cache of one or more of a database application, a virtual machine, or an operating system.

10. A computer system, comprising:
    one or more processors; and
    one or more hardware storage devices having stored thereon computer-executable instructions that are executable to cause the computer system to replicate, at an application cache of the computer system, at least a portion of an application cache of a second computer system, the computer-executable instructions further including instructions to cause the computer system to perform at least:
receive a plurality of cache portion identifiers from the second computer system, the plurality of cache portion identifiers each being associated with one of a plurality of cache portions that have been added to the application cache of the second computer system, each given cache portion identifier of the plurality of cache portion identifiers comprising less than an entirety of a cache portion to which the given cache portion identifier corresponds;
in response to receiving the plurality of cache portion identifiers, retrieve one or more cache portions that each correspond to one of the plurality of received cache portion identifiers from a storage node that is separate from the computer system and the second computer system; and
cache at least one cache portion of the one or more retrieved cache portions in the application cache the computer system.

11. The computer system of claim 10, wherein the storage node is a network-based storage node shared by the first and second computer systems.

12. The computer system of claim 10, wherein the application cache at the second computer system comprises a primary application cache, and the application cache at the first computer system comprises a secondary application cache.

13. The computer system of claim 10, wherein retrieving the one or more cache portions comprises retrieving all cache portions associated with the plurality of received identifiers.

14. The computer system of claim 10, wherein retrieving cache portions occurs multiple times as an application operates at the second computer system.

15. The computer system of claim 10, wherein the first and second computer systems are compute nodes within a cloud computer system.

16. The computer system of claim 10, wherein one or more of the application cache at the second computer system or the application cache at the first computer system is stored on volatile memory.

17. The computer system of claim 10, wherein one or more of the application cache at the second computer system or the application cache at the first computer system is stored on non-volatile memory.

18. The computer system of claim 10, wherein the application cache is a cache of one or more of database application, virtual machine, or an operating system.

19. A computer program product comprising one or more hardware storage devices having stored thereon computer-executable instructions that are executable to cause a first computer system to replicate, at an application cache of the first computer system, at least a portion of an application cache of a second computer system, the computer-executable instructions further including instructions to cause the first computer system to perform at least:
receive a plurality of cache portion identifiers from the second computer system, the plurality of cache portion identifiers each being associated with one of a plurality of cache portions that have been added to the application cache of the second computer system, each given cache portion identifier of the plurality of cache portion identifiers comprising less than an entirety of a cache portion to which the given cache portion identifier corresponds;
in response to receiving the plurality of cache portion identifiers, retrieve one or more cache portions that each correspond to one of the plurality of received cache portion identifiers from a storage node that is separate from the first computer system and the second computer system; and
cache at least one cache portion of the one or more retrieved cache portions the application cache the computer system.

20. The computer program product of claim 19, wherein the storage node is a network-based storage node shared by the first and second computer systems, wherein the application cache at the second computer system comprises a primary application cache, and wherein the application cache at the first computer system comprises a secondary application cache.

* * * * *